(12) United States Patent
Vance et al.

(10) Patent No.: US 11,069,216 B2
(45) Date of Patent: Jul. 20, 2021

(54) PERFORMANCE CHARACTERIZATION FOR A COMPONENT OF AN AUTOMATED INDUSTRIAL PROCESS

(71) Applicant: Rockwell Automation Technologies, Inc., Mayfield Heights, OH (US)

(72) Inventors: Gregory J. Vance, Brunswick, OH (US); Mikica Cvijetinovic, North Royalton, OH (US); Francisco P. Maturana, Lyndhurst, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 22 days.

(21) Appl. No.: 16/541,500

(22) Filed: Aug. 15, 2019

(65) Prior Publication Data

US 2020/0152044 A1 May 14, 2020

Related U.S. Application Data

(60) Provisional application No. 62/760,374, filed on Nov. 13, 2018.

(51) Int. Cl.
| | |
|---|---|
| *G08B 21/00* | (2006.01) |
| *G08B 21/18* | (2006.01) |
| *G05B 19/418* | (2006.01) |
| *G05B 19/042* | (2006.01) |
| *G05B 23/02* | (2006.01) |

(52) U.S. Cl.
CPC ....... *G08B 21/187* (2013.01); *G05B 19/0425* (2013.01); *G05B 19/4183* (2013.01); *G05B 19/4184* (2013.01); *G05B 23/0221* (2013.01); *G08B 21/182* (2013.01)

(58) Field of Classification Search
CPC ............. G08B 21/187; G08B 21/182; G05B 19/0425; G05B 19/4183; G05B 19/4184; G05B 23/0221
See application file for complete search history.

(56) References Cited

U.S. PATENT DOCUMENTS

| | | | | |
|---|---|---|---|---|
| 5,923,247 A | * | 7/1999 | Dowden | .................. H04L 43/16 340/506 |
| 10,533,761 B2 | * | 1/2020 | Barton | ..................... F24F 11/30 |
| 2002/0184568 A1 | * | 12/2002 | Kurrasch | ............ H04L 41/0681 714/39 |

* cited by examiner

*Primary Examiner* — Phung Nguyen (57) ABSTRACT

Described herein are improvements for characterizing performance of a component in an automated industrial process. In one example, a method includes, for each period of a plurality of periods, at least until an alert is triggered, updating a count of failed operations attempted by the first component and a percentage of a count of total operations attempted by the first component represented by the count of failed operations. The method further includes decrementing a trigger value when the count of failed operations does not increase for the period and incrementing the trigger value when the count of failed operations increases for the period. Also, the method includes triggering the alert in response to the trigger value satisfying a trigger value criterion and either the count of failed operations satisfying a count criterion or the percentage satisfying a percentage criterion.

20 Claims, 8 Drawing Sheets

| ALERT TRIGGER INFORMATION 333 | | | | |
|---|---|---|---|---|
| PERIOD | TOTAL FAIL. COUNT | TOTAL ATTEMPTS | FAILURE % | TRIGGER VALUE |
| 0 | 0 | 0 | 0 | 0 |
| 1 | 2 | 8 | 25 | 1 |
| 2 | 3 | 14 | 20 | 1.33 |
| 3 | 3 | 21 | 14.29 | 0 |
| 4 | 5 | 29 | 17.24 | 1 |
| 5 | 6 | 36 | 16.67 | 1.33 |
| 6 | 9 | 42 | 21.43 | 2.33 |
| 7 | 10 | 50 | 20 | 2.66 |
| 8 | 13 | 58 | 22.41 | 3.66 |

| ALERT TRIGGER INFORMATION 401 | | |
|---|---|---|
| PERIOD | FAILURE COUNT | PERIOD ATTEMPTS |
| 1 | 2 | 8 |
| 2 | 1 | 6 |
| 3 | 0 | 7 |
| 4 | 2 | 8 |
| 5 | 1 | 7 |
| 6 | 3 | 6 |
| 7 | 1 | 8 |
| 8 | 3 | 8 |

PERFORMANCE CHARACTERIZATION FOR A COMPONENT OF AN AUTOMATED INDUSTRIAL PROCESS

RELATED APPLICATIONS

This application is related to and claims priority to U.S. Provisional Patent Application 62/760,374, titled "IMPROVED PERFORMANCE CHARACTERIZATION FOR A COMPONENT OF AN AUTOMATED INDUSTRIAL PROCESS," filed Nov. 13, 2018, and which is hereby incorporated by reference in its entirety.

TECHNICAL BACKGROUND

Automated industrial processes are performed using different components working in tandem to produce a result. For example, components may be configured to assemble a product and package that product for shipment. Especially during processes that involve a large number of components, it is possible to overlook individual components that are not functioning optimally. For instance, a single component under performing a task may not noticeably affect the overall performance of the process when other components are performing the same task. Over time, even that single underperforming component can have an appreciable impact on the output of the process.

OVERVIEW

Described herein are improvements for characterizing performance of a component in an automated industrial process. In one example, a method includes, for each period of a plurality of periods, at least until an alert is triggered, updating a count of failed operations attempted by the first component and a percentage of a count of total operations attempted by the first component represented by the count of failed operations. The method further includes decrementing a trigger value when the count of failed operations does not increase for the period and incrementing the trigger value when the count of failed operations increases for the period. Also, the method includes triggering the alert in response to the trigger value satisfying a trigger value criterion and either the count of failed operations satisfying a count criterion or the percentage satisfying a percentage criterion.

In some embodiments, the method includes, in response to the alert, transferring the alert to the first component of the automated industrial process. The first component in these embodiments adjusts operating parameters of the first component to remedy an issue that caused the alert.

In some embodiments, in response to the alert, transferring the alert to a second component of the automated industrial process. The second component in these embodiments adjusts operation of the first component to remedy an issue that caused the alert. In these embodiments, the method may include decrementing the trigger value after the second component adjusts the operation of the first component.

In some embodiments, the method includes, in response to the alert, presenting the alert to a user via a user interface. In these embodiments, the method may include receiving an instruction from the user to decrement the trigger value and decrementing the trigger value in response to the instruction.

In some embodiments, after triggering the alert, the method includes refraining from triggering another alert for a predetermined period of time.

In some embodiments, incrementing the trigger value includes incrementing the trigger value a first amount when the count of failed operations increases for the period and the percentage decreases during the period and incrementing the trigger value a second amount, greater than the first amount, when both the count of failed operations increases for the period and the percentage does not decrease for the period.

In some embodiments, the method includes for each period of the plurality of periods, receiving operation information that indicates an amount of operations attempted during the period and an amount of operations that failed during the period, wherein the operation information is used to update the count of failed operations and the percentage.

In some embodiments, decrementing the trigger value comprises setting the trigger value to zero.

In another embodiment, an apparatus is provided having one or more computer readable storage media and a processing system operatively coupled with the one or more computer readable storage media. Program instructions stored on the one or more computer readable storage media that, when read and executed by the processing system, direct the processing system to, for each period of a plurality of periods, at least until an alert is triggered, update a count of failed operations attempted by the first component and a percentage of a count of total operations attempted by the first component represented by the count of failed operations. The program instructions further direct the processing system to decrement a trigger value when the count of failed operations does not increase for the period and increment the trigger value when the count of failed operations increases for the period. Also, the program instructions direct the processing system to trigger the alert in response to the trigger value satisfying a trigger value criterion and either the count of failed operations satisfying a count criterion or the percentage satisfying a percentage criterion.

DETAILED DESCRIPTION

When components in an industrial automation processes start underperforming, an alert indicating that they are underperforming can notify human operators of the components, or notify other automated components, capable of correcting the underperformance issues. If an alert comes pre-maturely (e.g., in response to an anomaly that would have corrected itself), resources used to address the alert may be wasted. If an alert comes too late or not at all (e.g., the underperformance goes unrecognized), then the output of the process may be adversely affected in the aggregate. For example, an automated industrial process may be configured to optimally create 1,000 products per hour. An underperforming component in the process that causes only 998 products per hour to be created may go unnoticed since 2 products per hour is a very small amount. However, that two products per hour could add up to an appreciable number of products over time. As such, at some point it makes business sense for the operator of the industrial automation process to recognize and spend the resources needed to fix the underperforming component as soon as possible. In contrast, it does not make business sense to spend the resources needed to fix the underperforming component if it is possible that the issue causing the underperformance will correct itself or was otherwise simply an anomaly. The alerts described in the examples below are therefore provided at times to minimize the waste of resources while also ensuring an underperforming component does not go unnoticed.

Figure 1:
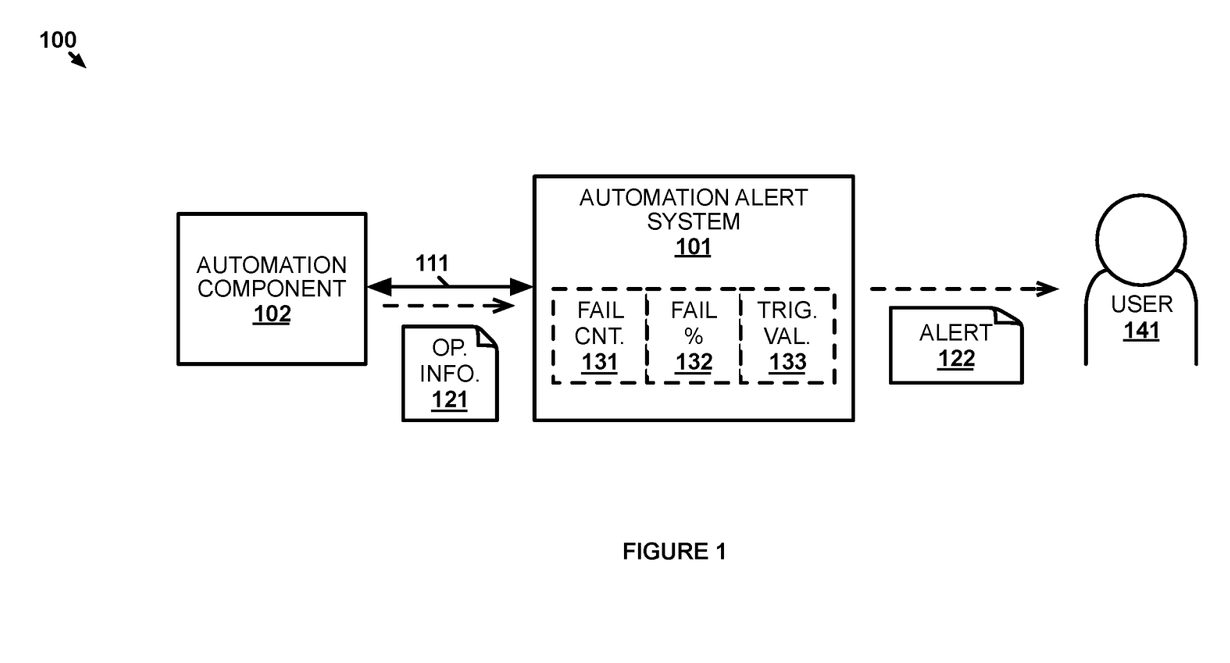
FIG. 1 illustrates an example implementation for characterizing performance of a component in an automated industrial process.

FIG. 1 illustrates implementation 100 for characterizing performance of a component in an automated industrial process. Implementation 100 includes automation alert system 101 and automation component 102. Automation alert system 101 and automation component 102 communicate over communication link 111, which may be a direct link or may include one or more intervening systems, networks, and/or devices. Automation component 102 is a physical component operating in an automated industrial process. In particular, automation component 102 is a component that performs an operation that can be characterized in a binary manner. This example uses the terms successful and failed to describe the binary aspect of automation component 102's performance but other terms could be used instead while maintaining the same meaning (e.g., accepted/rejected performance of the operation). For example, automation component 102 may comprise a nozzle performing a pick operation during the industrial automation process.

Operation information 121 indicates to automation alert system 101 a number of operations attempted by automation component 102 and how many of those attempted operations failed. Using the nozzle example from above, operation information 121 may indicate a number of pick operations attempted by the nozzle and how many of those attempted pick operations failed to result in a completed pick. In this example, automation alert system 101 receives operation information 121 from automation component 102 directly. However, automation component 102 is some cases does not include circuitry necessary to communicate with automation alert system 101. In those cases, another system may be tasked with monitoring the operation of automation component 102 and communicating operation information 121 to automation alert system 101. For instance, automation component 102 may be one of many nozzles tasked with performing pick operations. A nozzle control system may be tasked with operating those nozzles and monitoring the results of each operation. That nozzle control system may then transfer operation information 121 for automation component 102 to automation alert system 101 over communication link 111. In some examples, automation alert system 101 may be incorporated into automation component 102 or the system monitoring the operation of automation component 102. Operation information 121 may be transferred to automation alert system 101 periodically, upon request from operation information 121, after each operation (i.e., to indicate right away whether each particular operation had failed), or on some other schedule.

Figure 2:
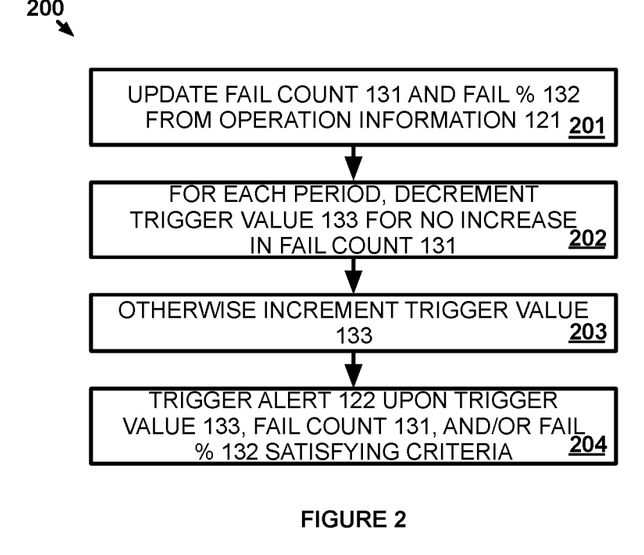
FIG. 2 illustrates an operational scenario for characterizing performance of a component in an automated industrial process.

FIG. 2 illustrates operational scenario 200 for characterizing performance of a component in an automated industrial process. Operational scenario 200 provides automation alert system 101 periodically updating failed operations count 131, which is a count of failed operations attempted by automation component 102 since automation alert system 101 started maintaining failed operations count 131, and failed operations percentage 132, which comprises the percentage of a count of total operations attempted by automation component 102 that failed operations percentage 132 represent (201). Of course, when automation alert system 101 begins tracking failed operations count 131 and failed operations percentage 132, both values will initially be set to zero before operation information 121 received for a first period is used to update them accordingly. It is also possible that updating failed operations count 131 and failed operations percentage 132 does not change their values if no failed operations occurred during the last period. However, if a number of failed operations did occur during the last period, that number of failed operations will be added to failed operations count 131 and the total number of operations attempted during the last period will be added to a running total of operations attempted for all periods. Updated failed operations percentage 132 can then be calculated from the ratio of updated failed operations percentage 132 to the updated running total of operations attempted for all periods. A period may be defined based on time, number of operations, or some other manner of indicating how often failed operations count 131 and failed operations percentage 132 should be updated.

For each period of the above periods, at least until an alert is triggered, automation alert system 101 decrements trigger value 133 (e.g., reduces the value of trigger value 133 by a given amount or resets the value to a given number, such as 0) when failed operations count 131 does not increase from the preceding period (202). It should be understood that there may be a floor value (e.g., 0) below which the trigger value cannot be decremented (e.g., decrementing a trigger value at 0 results in that trigger value remaining at 0). Alternatively, automation alert system 101 increments trigger value 133 when failed operations count 131 increases from the immediately preceding period (203). Trigger value 133 may be incremented the same amount regardless (e.g., incremented by 1 regardless of whether failed operations percentage 132 also increased from the preceding period) or different increments may be used depending on whether failed operations percentage 132 also increased from the preceding period. In a particular example, trigger value 133 may be only be increased by 0.33 when failed operations count 131 increases but failed operations percentage 132 decreases from the immediately preceding period. While all other cases where failed operations count 131 increases from the immediately preceding period result in trigger value 133 being increased by 1. The increments used above can be adjusted based on what values result in minimizing the waste of resources while also ensuring an underperforming component does not go unnoticed.

Once failed operations count 131, failed operations percentage 132, and trigger value 133 have been updated for a particular period, automation alert system 101 determines whether an alert should be triggered. Specifically, automation alert system 101 triggers alert 122 in response to trigger value 133 satisfying a trigger value criterion and either the count of failed operations satisfying a count criterion or the percentage satisfying a percentage criterion (204). For example, the trigger value criterion may indicate that trigger value 133 should be at least 5 before triggering an alert. Likewise, the count criterion may indicate that failed operations count 131 should be at least 50 and the percentage criterion may indicate that failed operations percentage 132 should be at least 10%. Using those values as examples, automation alert system 101 would not trigger an alert after a given period if trigger value 133 is less than 5. However, if trigger value 133 is at least 5, then automation alert system 101 determines whether failed operations count 131 is at least 50 and/or failed operations percentage 132 is at least 10% and, if so, triggers alert 122. The criteria used above can be adjusted based on what values result in minimizing the waste of resources while also ensuring an underperforming component does not go unnoticed.

In this example, alert 122 is a user alert indicating to user 141 that automation component 102 is in need of attention to remedy its high occurrence of failures. Automation alert system 101 may include a user interface to directly present user 141 (e.g., display or audibly produce alert 122 for user 141) or automation alert system 101 may present alert 122 to user 141 via another system, such as a user device operated by user 141, to which alert 122 is transferred. Alternatively, alert 122 may be transferred to another automation component that can at least attempt to remedy the issue that caused automation alert system 101 to trigger alert 122. For example, if automation component 102 is the nozzle discussed above, that other component may be an automated system for replacing nozzles. Upon receiving alert 122, the other component may then replace automation component 102 with a new nozzle. Once action has been taken to remedy the issue caused by automation component 102 (e.g., automation component 102 is replaced or otherwise fixed), then automation alert system 101 may begin anew with failed operations count 131, failed operations percentage 132, and trigger value 133 set back to zero for the replacement (or fixed) automation component 102.

In some cases, it may take some time to respond to alert 122. Accordingly, automation alert system 101 may be configured to not re-trigger alert 122 for a number of subsequent periods. Thus, even if the values of failed operations count 131, failed operations percentage 132, and trigger value 133 indicate that an alert should be triggered, automation alert system 101 may be configured to refrain from doing so for an amount of time (e.g., 45 minutes).

In some examples, automation alert system 101 may display a graph of failed operations count 131 vs. failed operations percentage 132. As with alert 122, automation alert system 101 may include a user interface to display the graph directly to user 141 or may display the graph through a user device operated by user 141. In some cases, the graph may be displayed to user 141 via a graphical interface that user 141 may also use to monitor, control, or perform some other function related to the automated industrial process.

It should be understood that, while the above examples described automation alert system 101 monitoring a single component, automation alert system 101 may be tasked with monitoring any number of components in the automated industrial process. Again, referring to the nozzle example, automation alert system 101 may be configured to monitor other nozzles in the same manner in which automation alert system 101 monitors automation component 102 above. Automation alert system 101 is then capable of providing alerts concerning particular ones of the nozzles.

While the above example appears to show automation alert system 101 implemented in a single device, it should be understood that automation alert system 101 may be distributed across multiple devices. In some examples, automation alert system 101 may be implemented at least partially using a cloud computing service, as discussed in the examples below.

Figure 3:
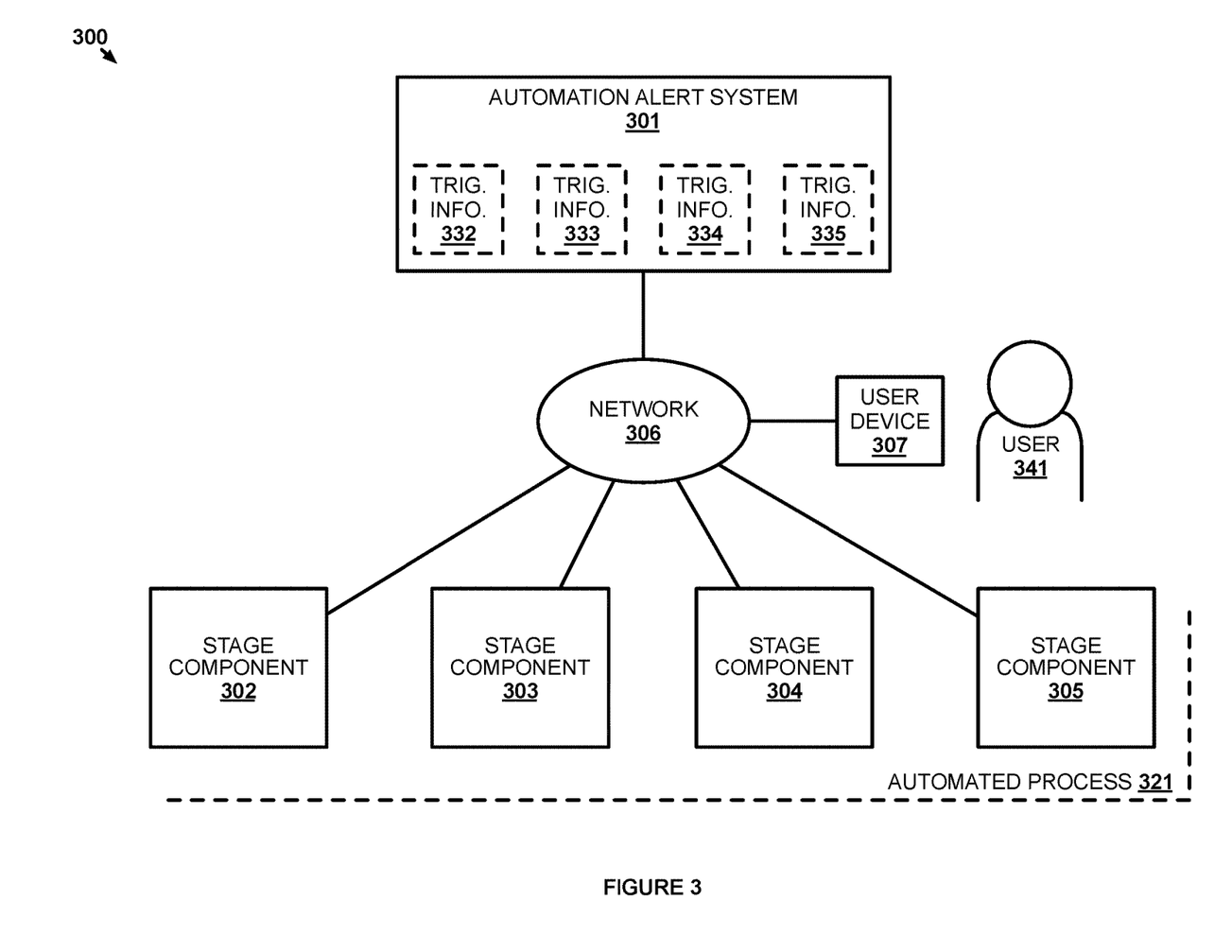
FIG. 3 illustrates another example implementation for characterizing performance of a component in an automated industrial process.

FIG. 3 illustrates implementation 300 for characterizing performance of a component in an automated industrial process. Implementation 300 includes automation alert system 301, stage component 302, stage component 303, stage component 304, stage component 305, and communication network 306, which operate together to perform automated process 321. Communication network 306 may comprise a single communication network, such as a local area network (LAN), or may include multiple networks, such as multiple LANs and/or a wide area network (WAN) like the Internet, over which communications are transferred between automation alert system 301, stage component 302, stage component 303, stage component 304, stage component 305, and user device 307. In some examples, one or more of stage component 302, stage component 303, stage component 304, stage component 305 may be connected to a process control system for automated process 321, which in turn connects to communication network 306, rather than being directly connected to communication network 306. Communications over communication network 306 allow automation alert system 301 to be a local system to automated process 321 or to be remote system, such as a cloud service system, for automated process 321 and potentially other automated processes.

In operation, automated process 321 may be an automated process for producing, modifying, or otherwise interacting with a physical item, or may be some other type of process that can be automated by industrial automation components. User 341 uses user device 307 to interact with automation alert system 301 and, at least, receive alerts when issues may arise within automated process 321. In some examples, user device 307 may allow user 341 to control other aspects of automated process 321. While user device 307 is shown as the sole way of interacting with automation alert system 301 in this example to illustrate the versatility of automation alert system 301 being connected to communication network 306, other user interfaces may be implemented in implementation 300 to interact with automation alert system 301. Automation alert system 301 determines when any of stage component 302, stage component 303, stage component 304, and stage component 305 are potentially having performance issues and provides an alert. To determine when a performance issue may exist, automation alert system 301 maintains trigger information 332 for stage component 302, trigger information 333 for stage component 303, trigger information 334 for stage component 304, and trigger information 335 for stage component 305. Trigger information 332, trigger information 333, trigger information 334, and trigger information 335 includes information regarding operation failures of their respective stage components. Criteria are used by automation alert system 301 on trigger information 332, trigger information 333, trigger information 334, and trigger information 335 to determine when an alert should be triggered, as described in more detail below.

Figure 4:
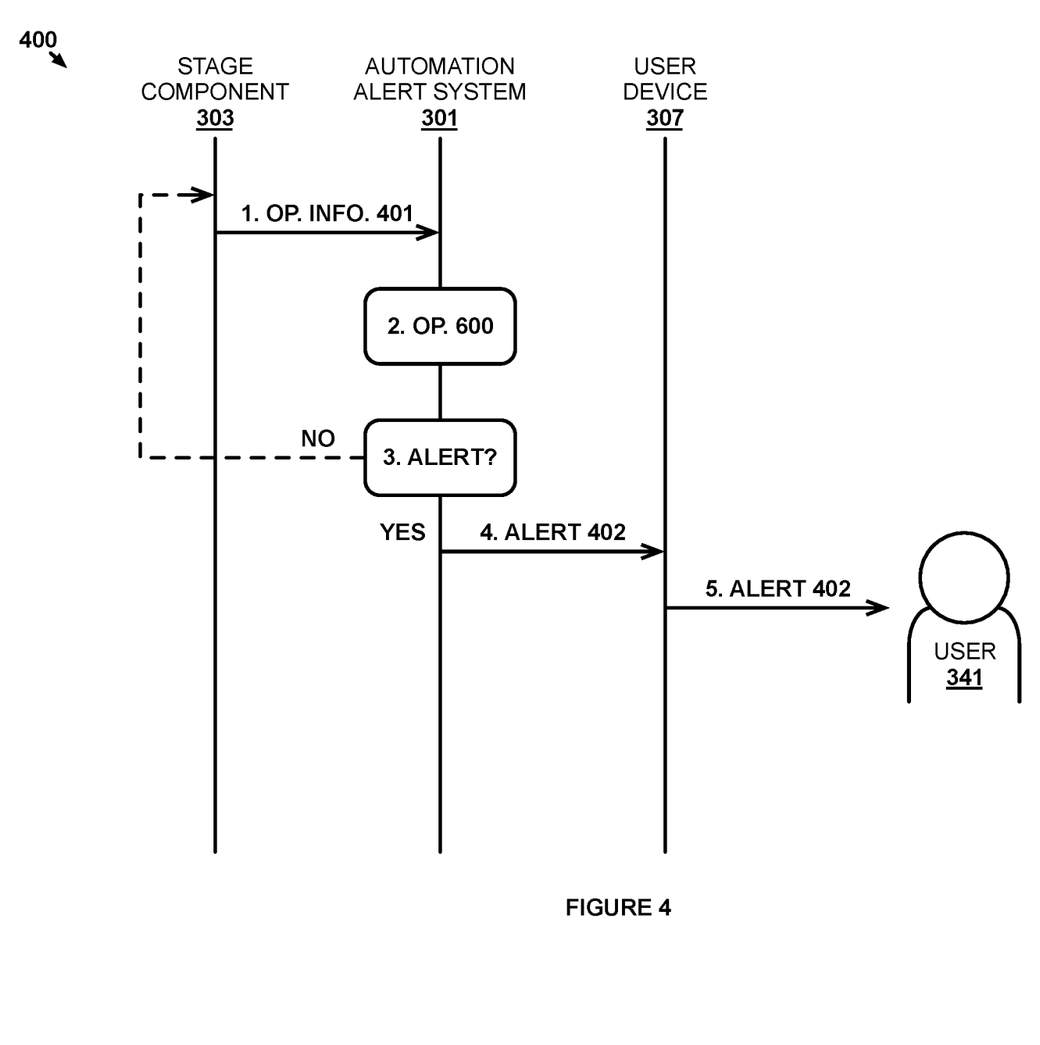
FIG. 4 illustrates an operational scenario for characterizing performance of a component in an automated industrial process.

FIG. 4 illustrates operational scenario 400 for characterizing performance of a component in an automated industrial process. Operational scenario 400 focuses on stage component 303 and its associated trigger information 333 but similar steps occur for stage component 302, stage component 304, and stage component 305 with their respective trigger information 332, trigger information 334, and trigger information 335. A stage component therefore comprises any component in automated process 321 for which operational scenario 400 can be performed independent of other components. For example, a stage component may comprise an entire stage or may be a component of that stage (e.g., individual picking nozzles of a picking stage may each have operational scenario 400 performed independently). In operational scenario 400, stage component 303 transfers operating information 401 to automation alert system 301 at step 1. Operating information 401 corresponds to operations performed during a period of time (e.g., 2 minutes), although other examples may measure a period differently. Operating information 401 at least includes the number of operations attempted by stage component 303 during the period of time and the number of those attempted operations that failed during the period of time.

Figure 6:
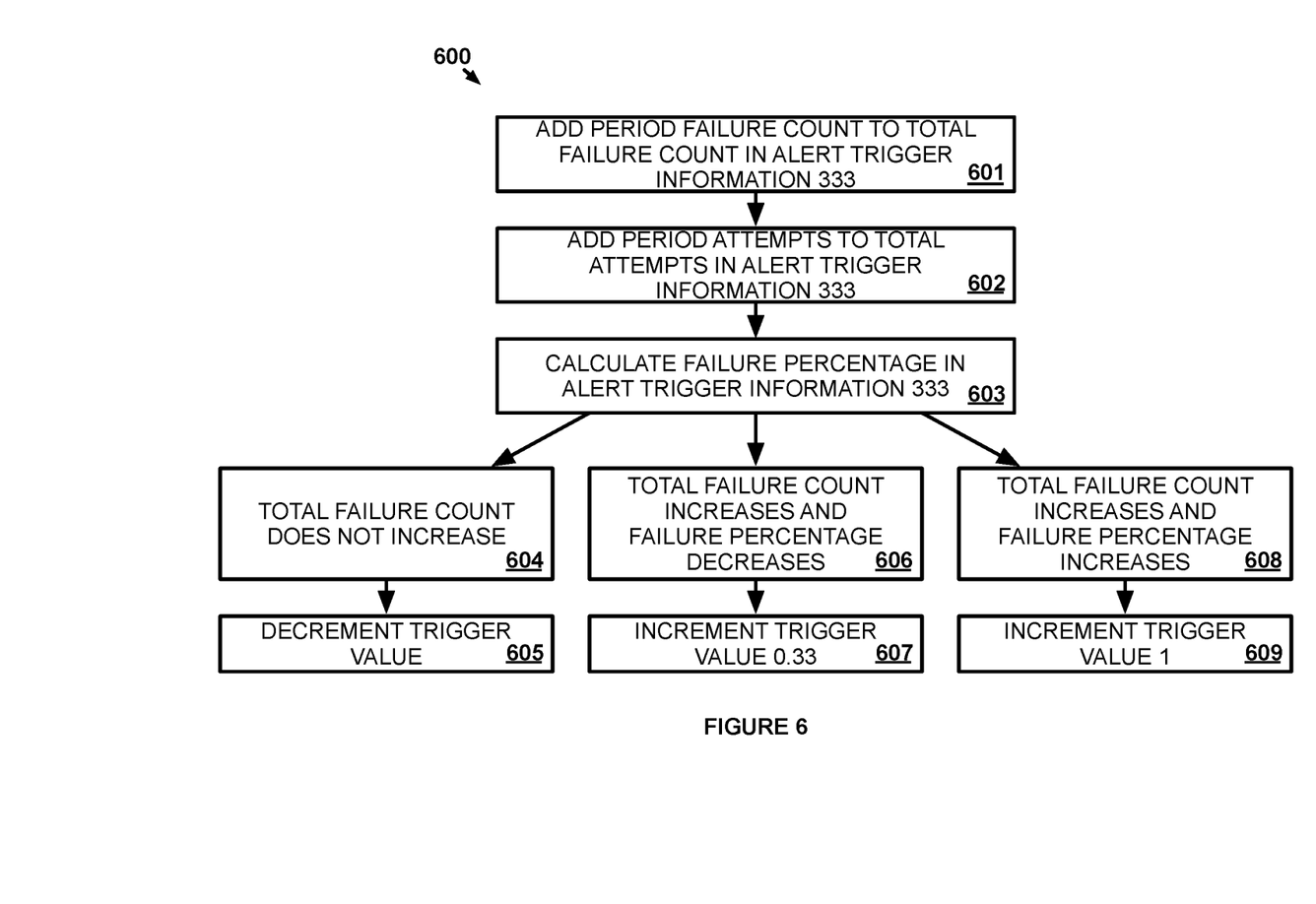
FIG. 6 illustrates an operation for characterizing performance of a component in an automated industrial process.

Automation alert system 301 performs operation 600 described below with operating information 401 at step 2 to update trigger information 333. Once trigger information 333 has been updated by operation 600, automation alert system 301 determines at step 3 whether trigger information 333 indicates an alert should be triggered with respect to stage component 303. If trigger information 333 does not indicate an alert should be triggered, then operational scenario 400 returns to the beginning to receive operating information 401 for the next period of time. If trigger information 333 does indicate that an alert should be triggered, then automation alert system 301 generates alert 402. Automation alert system 301 applies at least one criterion to trigger information 333 to determine whether the at least one criterion is satisfied, which indicates that alert 402 should be triggered.

Alert 402 in this example, alert 402 comprises a message transferred at step 3 from automation alert system 301 to user device 307. User device 307 then presents the message from automation alert system 301 to user 341 at step 5 to inform user 341 of alert 402. The message may be a message in a conventional messaging format (e.g., short message service, email, etc.) or may be a proprietary messaging format used by automation alert system 301 (e.g., a message that requires an application executing on user device 307 to receive and present the message). Alert 402 may be visually presented to user 341 (e.g., a graphical notification on a display of user device 307, an LED notification light, etc.), audible presented to user 341 (e.g., play a notification sound, play a voice message, etc.), perform a tactile notification (e.g., device vibration), or may be presented in some other manner—including combinations thereof. In some examples, alert 402 may itself indicate to user 341 that there may be an issue with stage component 303. In other examples, alert 402 may simply be a generic notification to user 341 that notifies user 341 of a message from automation alert system 301. User 341 can then open an application that interfaces with automation alert system 301, open a webpage interface to automation alert system 301 in a web browser of user device 307, or perform some other action that allows user 341 to obtain additional details related to alert 402. In yet further examples, alert 402 may trigger automated process 321 to stop at least until the alert is acknowledge by support personal.

After receiving alert 402, user 341 is able to address stage component 303 as user 341 sees fit. Advantageously, using trigger information 333 and the at least one criterion, as described herein, user 341 is notified of an issue causing failed operations at stage component 303 that may have otherwise gone unnoticed.

Figure 5:
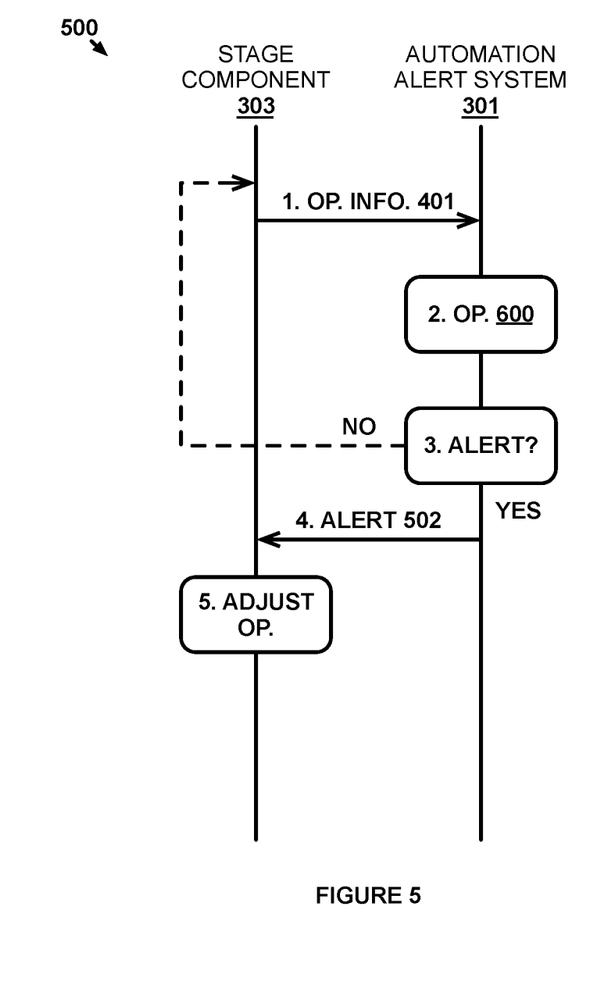
FIG. 5 illustrates another operational scenario for characterizing performance of a component in an automated industrial process.

FIG. 5 illustrates operational scenario 500 for characterizing performance of a component in an automated industrial process. Operational scenario 500 begins similarly to operational scenario 400 described above with steps 1-3. In this example, instead of, or in addition to, transferring alert 402 to user device 307 when trigger information 333 indicates an alert should be triggered, automation alert system 301 generates alert 502 and transfers alert 502 at steep 4 to stage component 303. In this example, alert 502 indicates to stage component 303 that stage component 303 is having an issue that causes failed operations. Upon being notified by alert 402, stage component 303 adjusts its operation at step 5 in an attempt to remedy the issue causing the failed operations. Adjusting stage component 303's operation may include adjusting operating parameters for current hardware or may include changing one or more hardware elements of stage component 303. For example, stage component 303 may include a picker nozzle and stage component 303 may be capable of automatically replacing the picker nozzle in response to alert 502. In other examples, alert 502 may be transferred to another component that can change hardware elements of stage component 303 (e.g., replaces the picker nozzle for stage component 303).

It should be understood that operational scenario 400 and operational scenario 500 include two examples of alerts that may be triggered. Other examples may trigger other/additional alerts and transfer those alerts to interested parties/components. In some examples, automation alert system 301 may itself have a user interface, if not located in a remote cloud environment, and present an alert on that user interface.

FIG. 6 illustrates operation 600 for characterizing performance of a component in an automated industrial process. Operation 600 is performed in step 2 of both operational scenario 400 and operational scenario 500, as described above. In operation 600, automation alert system 301 updates a total failure count by adding in the number of failed operations that occurred during the period of time corresponding to operating information 401 as indicated by operating information 401 (601) Likewise, automation alert system 301 updates a count of total operations attempted by adding in the total number of operations attempted during the period of time as indicated by operating information 401 (602). Once the count of failed operations and the count of total operations attempted have been updated, automation alert system 301 calculates the failure percentage (i.e., the total failure count divided by the count of total operations attempted multiplied by 100). In some examples, automation alert system 301 may leave the failure percentage in decimal form.

Automation alert system 301 has three possible options for updating the trigger value. If the total failure count does not increase during the period of time corresponding to operating information 401 (604), then automation alert system 301 decrements the trigger value (605). In these cases, the failure percentage may not be calculated since the failure percentage cannot increase if the total failure count does not increase. The trigger value may be decrement to 0 or may be decremented to some other value depending on how a user has configured automation alert system 301. For instance, automation alert system 301 may be configured in those other examples to decrement the trigger value by a given amount as a reset rather than returning to zero.

If the total failure count increases and the failure percentage decreases during the period of time corresponding to operating information 401 (606), then automation alert system 301 increments the trigger value by 0.33 (607). If both the total failure count and the failure percentage increase during the period of time corresponding to operating information 401 (608), then automation alert system 301 increments the trigger value by 1 (609). In this example, two different amounts of incrementation are provided (i.e., 0.33 and 1) while other examples may use only one amount of incrementation (e.g., this example may consider only the failure count increasing to be less indicative of an issue with stage component 303 than if the failure percentage also increases). The amounts in which the trigger value is incremented may also be defined on a case-by-case basis (e.g., the amounts used here for stage component 303 may not be the same as those used for stage component 302). Similarly, the severity of a a change between periods may also affect the increment amount. For example, rather than incrementing by 1 when the failure count and failure percentage both increase any amount, the increment amount may be larger for larger increases in failure count and failure percentage. Additionally, user 341, or an artificial intelligence (AI) executing on automation alert system 301 or another system, may be able to tune the incrementation amounts and the threshold for the trigger value to trigger an alert based on observed alerts to ensure appreciable performance issues are being alerted while performance issues that do not appreciably affect overall system performance are not alerted.

In an example, the AI may track the total failure count, failure percentage, trigger value, and alerts over time to determine the sensitivity of alerts based on the current trigger value increment amount(s), decrement amount(s), and/or alert trigger thresholds being used by automation alert system 301. The current increment amounts, decrement amounts, and/or alert trigger thresholds may be defaults or may be previously set by the AI or a human user. The AI may then adjust one or more of the trigger value increment amounts, decrement amounts, and alert trigger thresholds in an attempt to achieve a desired alert sensitivity. In some cases, the AI may be able to recognize trends across multiple components even though each component may have an independent trigger value. For example, in a scenario where multiple nozzles are being monitored as part of automated process 321, the AI may be able differentiate between several of the nozzles increasingly failing operations while staying within the current alert triggering threshold and a few of the nozzles moving quickly towards the alert threshold. The AI may therefore narrow adjust the amounts/thresholds of at least those few anomalous nozzles in order to trigger an alert should they continue on their current trend. The AI may then readjust the amounts/thresholds once the AI has determined that affected nozzles are no longer on a quick undesirable trend.

Figure 7:
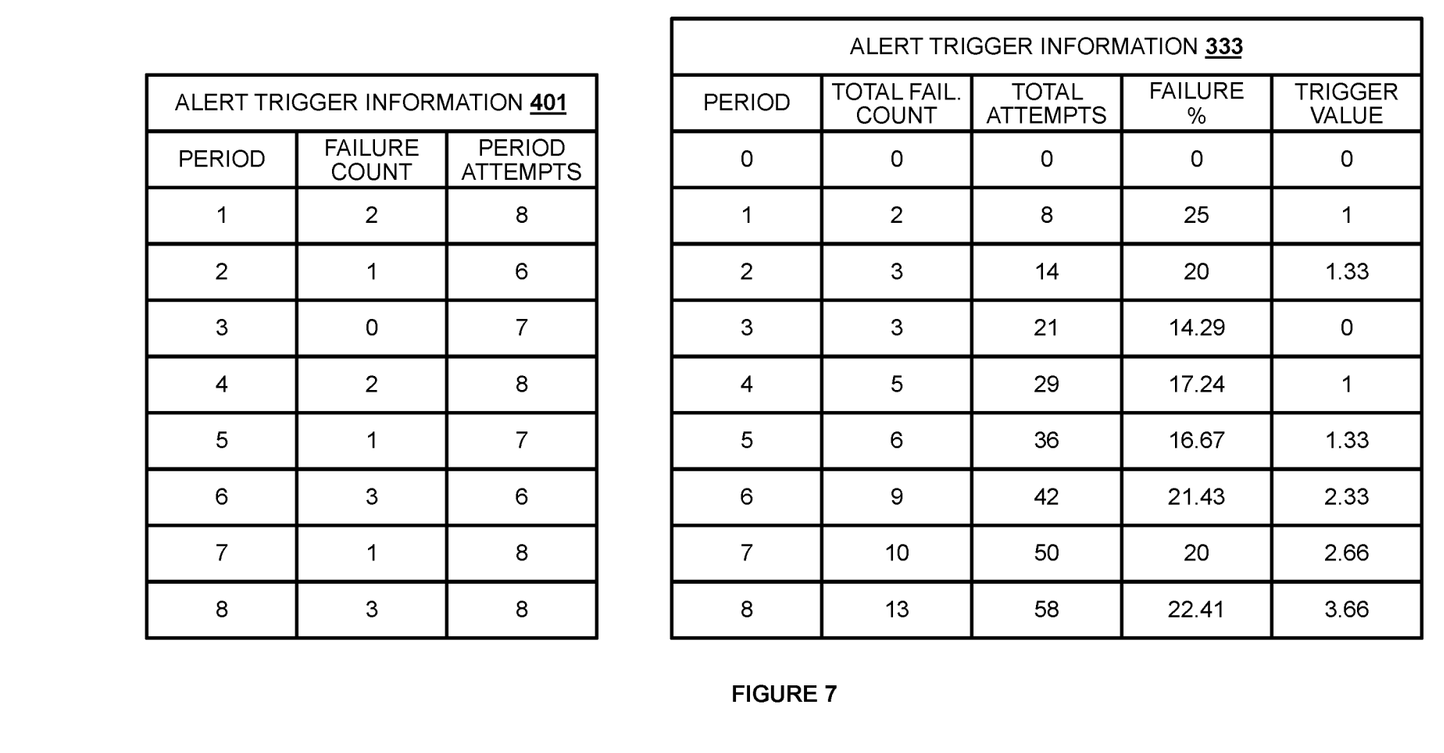
FIG. 7 illustrates an operational scenario for characterizing performance of a component in an automated industrial process.

FIG. 7 illustrates operational scenario 700 for characterizing performance of a component in an automated industrial process. Operational scenario 700 includes examples of operating information 401 obtained by automation alert system 301 over 8 periods of time and examples of trigger information 333 created by operation 600 during those 8 periods of time. In this example, each period of operating information 401 is shown as a table, although, it should be understood, that automation alert system 301 obtains operating information 401 for each period each time steps 1-3 repeat during operational scenario 400 and operational scenario 500. Likewise, trigger information 333 is a table showing the status of trigger information 333 during all 8 periods but values for past periods may be removed once values for the current period are calculated.

Trigger information 333 begins with all values of trigger information 333 set to 0. The values may be all zero because automated process 321 is just starting for the day, automated process 321 is beginning to fulfill a particular work order, the values have just been reset after adjustments were made to stage component 303, or for some other reason. Regardless, once automation alert system 301 receives operating information 401 for period 1, automation alert system 301 updates trigger information 333 in accordance with operation 600. In particular, 2 failed operations are added to the total failure count, 8 attempted operations are added to the count of total operations attempted, the failure percentage is calculated to be 25%, and the trigger value is increased to 1.

In this example, the criteria applied to trigger information 333 to determine whether an alert should be triggered indicates that the total failure count must be greater than 9 total failures and the trigger value must be greater than 3 before an alert is triggered. Including the total failure count criterion prevents an alert from triggering off of a small sample set based solely on the trigger value. Similarly, other examples may require a certain failure percentage (e.g., greater than 10%) in addition to the trigger value criterion. The criteria used here in association with stage component 303 may be different for the other stage components 302, 304, and 305. For example, stage component 304 may perform more operations per period than stage component 303. The criteria for stage component 304 may therefore be that the total failure count be greater than 100 and the trigger value be greater than 10. Likewise, the trigger value increments discussed above, the criteria used to trigger an alert may be adjusted by user 341 depending on results.

When automation alert system 301 applies the criteria to trigger information 333 after period 1, no alert is triggered because the trigger value is only at 1 and the total failure count is only 2. Automation alert system 301 then receives operating information 401 for period 2 and performs operation 600. The criteria when applied to trigger information 333 for period 2 also does not trigger automation alert system 301 to generate an alert because the trigger value is only 1.33 and the total failure count is only 3. Automation alert system 301 then receives operating information 401 for period 3 and performed operation 600. In period 3, the trigger value is decremented to 0 by operation 600 and the criteria again does not trigger an alert. Automation alert system 301 repeats operation 600 and applies the criteria for each respective one of periods 4-7. As with periods 1-3, automation alert system 301 determines that no alert is triggered.

Automation alert system 301 then receives operating information 401 for period 8. After performing operation 600, the trigger value is at 3.66 and the total failure count is 13. Since both the trigger value and the total failure count are greater than defined by the criteria (i.e., trigger value greater than 3 and total failure count greater than 9), automation alert system 301 determines that an alert is triggered. Automation alert system 301 may then transfer alert 402 and/or alert 502, as described in operational scenario 400 and operational scenario 500 above.

In some examples, once an alert has been triggered, automation alert system 301 may wait a predetermined amount of time before triggering another alert for stage component 303. The predetermined amount of time may be a time determined by user 341, or otherwise, to be sufficient for addressing the performance issue that caused the alert. In one example, the predetermined amount of time may be measured in the time periods of operational scenario 700. So, once an alert is triggered after period 8, automation alert system 301 may be configured to wait 5 more periods before triggering another alert even if trigger information 333 indicates that an alert should be triggered for those periods.

After the cause of the alert has been addressed (e.g., by a user or automated component), automation alert system 301 may reset the trigger value, or all of trigger information, to ensure another alert is not generated soon thereafter. Automation alert system 301 may receive a notification indicating that the issue was addressed from whatever entity (e.g., user or component) addressed the issue. That notification may be treated by automation alert system 301 as an instruction to reset the trigger value. Alternatively, if the performance issue causing the alert has actually been found and addressed, the trigger value should be reset automatically due to the total failure count not increasing during operation 600.

Figure 8:
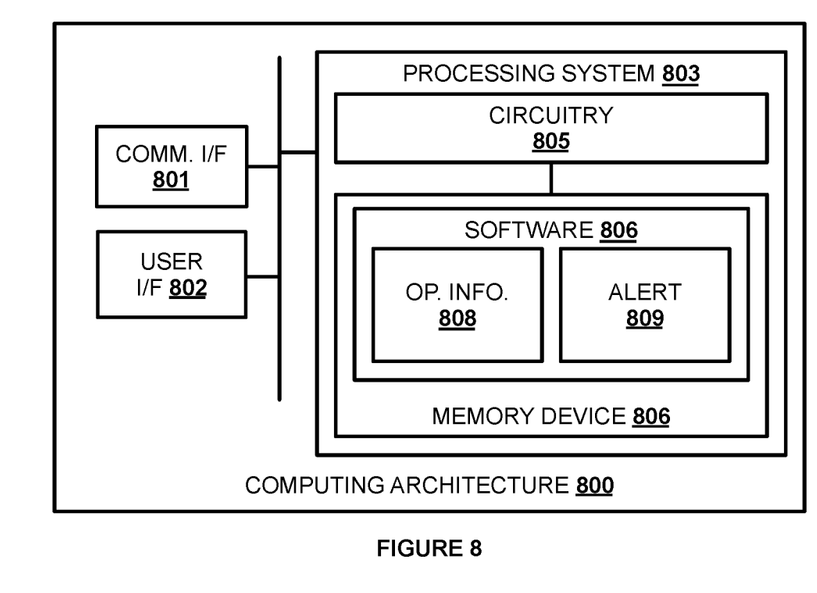
FIG. 8 illustrates an example computing architecture for characterizing performance of a component in an automated industrial process.

FIG. 8 illustrates computing architecture 800 for characterizing performance of a component in an automated industrial process. Computing architecture 800 is an example computing architecture for automation alert system 101, although alternative configurations may also be used. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises processing circuitry, such as a microprocessor, and other circuitry that retrieves and executes operating software 807 from memory device 806. Memory device 806 comprises one or more computer readable storage media, such as a disk drive, flash drive, data storage circuitry, or some other memory apparatus that in no cases should be considered a mere propagated signal. Operating software 807 comprises computer programs, firmware, or some other form of machine-readable processing instructions. Operating software 807 includes operation information module 808 and alert module 809. Operating software 807 may further include an operating system, utilities, drivers, network interfaces, applications, or some other type of software. When executed by circuitry 805, operating software 807 directs processing system 803 to operate computing architecture 800 as described herein.

In particular, operation information module 808 directs processing system 803 to periodically update a count of failed operations attempted by the component and a percentage of a count of total operations attempted by the component represented by the count of failed operations. For each period, at least until an alert is triggered, operation information module 808 further directs processing system 803 to decrement a trigger value when the count of failed operations does not increase from the preceding period and increment the trigger value when the count of failed operations increases from the preceding period. Alert module 809 directs processing system 803 to trigger an alert in response to the trigger value satisfying a trigger value criterion and either the count of failed operations satisfying a count criterion or the percentage satisfying a percentage criterion.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for performance characterization of a first component of an automated industrial process, the method comprising:
    for each period of a plurality of periods, at least until an alert is triggered:
    updating a count of failed operations attempted by the first component and a percentage of a count of total operations attempted by the first component represented by the count of failed operations;
    decrementing a trigger value when the count of failed operations does not increase for the period and incrementing the trigger value when the count of failed operations increases for the period; and
    triggering the alert in response to the trigger value satisfying a trigger value criterion and either the count of failed operations satisfying a count criterion or the percentage satisfying a percentage criterion.

2. The method of claim 1, further comprising:
    in response to the alert, transferring the alert to the first component of the automated industrial process; and
    wherein the first component adjusts operating parameters of the first component to remedy an issue that caused the alert.

3. The method of claim 1, further comprising:
    in response to the alert, transferring the alert to a second component of the automated industrial process; and
    wherein the second component adjusts operation of the first component to remedy an issue that caused the alert.

4. The method of claim 3, further comprising:
    decrementing the trigger value after the second component adjusts the operation of the first component.

5. The method of claim 1, further comprising:
    in response to the alert, presenting the alert to a user via a user interface.

6. The method of claim 5, further comprising:
    receiving an instruction from the user to decrement the trigger value; and
    decrementing the trigger value in response to the instruction.

7. The method of claim 1, further comprising:
    after triggering the alert, refraining from triggering another alert for a predetermined period of time.

8. The method of claim 1, wherein incrementing the trigger value comprises:
    incrementing the trigger value a first amount when the count of failed operations increases for the period and the percentage decreases during the period; and
    incrementing the trigger value a second amount, greater than the first amount, when both the count of failed operations increases for the period and the percentage does not decrease for the period.

9. The method of claim 1, further comprising:
for each period of the plurality of periods, receiving operation information that indicates an amount of operations attempted during the period and an amount of operations that failed during the period, wherein the operation information is used to update the count of failed operations and the percentage.

10. The method of claim 1, wherein decrementing the trigger value comprises setting the trigger value to zero.

11. An apparatus for improving performance characterization of a first component of an automated industrial process, the apparatus comprising:
one or more non-transitory computer readable storage media;
a processing system operatively coupled with the one or more non-transitory computer readable storage media; and
program instructions stored on the one or more computer readable storage media that, when read and executed by the processing system, direct the processing system to:
for each period of a plurality of periods, at least until an alert is triggered:
update a count of failed operations attempted by the first component and a percentage of a count of total operations attempted by the first component represented by the count of failed operations;
decrement a trigger value when the count of failed operations does not increase for the period and increment the trigger value when the count of failed operations increases for the period; and
trigger the alert in response to the trigger value satisfying a trigger value criterion and either the count of failed operations satisfying a count criterion or the percentage satisfying a percentage criterion.

12. The apparatus of claim 11, wherein the program instructions further direct the processing system to:
in response to the alert, transfer the alert to the first component of the automated industrial process; and
wherein the first component adjusts operating parameters of the first component to remedy an issue that caused the alert.

13. The apparatus of claim 11, wherein the program instructions further direct the processing system to:
in response to the alert, transfer the alert to a second component of the automated industrial process; and
wherein the second component adjusts operation of the first component to remedy an issue that caused the alert.

14. The apparatus of claim 13, wherein the program instructions further direct the processing system to:
decrement the trigger value after the second component adjusts the operation of the first component.

15. The apparatus of claim 11, wherein the program instructions further direct the processing system to:
in response to the alert, present the alert to a user via a user interface.

16. The apparatus of claim 15, wherein the program instructions further direct the processing system to:
receive an instruction from the user to decrement the trigger value; and
decrement the trigger value in response to the instruction.

17. The apparatus of claim 11, wherein the program instructions further direct the processing system to:
after the alert is triggered, refrain from triggering another alert for a predetermined period of time.

18. The apparatus of claim 11, wherein to increment the trigger value, the program instructions direct the processing system to:
increment the trigger value a first amount when the count of failed operations increases for the period and the percentage decreases during the period; and
increment the trigger value a second amount, greater than the first amount, when both the count of failed operations increases for the period and the percentage does not decrease for the period.

19. The apparatus of claim 11, wherein the program instructions further direct the processing system to:
for each period of the plurality of periods, receive operation information that indicates an amount of operations attempted during the period and an amount of operations that failed during the period, wherein the operation information is used to update the count of failed operations and the percentage.

20. One or more non-transitory computer readable storage media having program instructions stored thereon for improving performance characterization of a first component of an automated industrial process that, when read and executed by a processing system, direct the processing system to:
for each period of a plurality of periods, at least until an alert is triggered:
update a count of failed operations attempted by the first component and a percentage of a count of total operations attempted by the first component represented by the count of failed operations;
decrement a trigger value when the count of failed operations does not increase for the period and increment the trigger value when the count of failed operations increases for the period; and
trigger the alert in response to the trigger value satisfying a trigger value criterion and either the count of failed operations satisfying a count criterion or the percentage satisfying a percentage criterion.

* * * * *